United States Patent Office 3,346,362
Patented Oct. 10, 1967

3,346,362
METHOD FOR CONTROLLING WEEDS
William R. Diveley, Newark, Del., assignor to Hercules Incorporated, a corporation of Delaware
No Drawing. Filed Jan. 3, 1961, Ser. No. 79,974
5 Claims. (Cl. 71—118)

This invention relates to the selective control of the growth of plants by the application thereto of organic selective herbicides and to specific herbicidal compounds which have these selective herbicidal properties.

In accordance with the present invention, it has been found that in a mixed growth of desirable and undesirable plants, the undesired plants are selectively controlled by applying thereto a compound of the group consisting of N-(3,4-dichlorophenyl)-2,2-dimethylvaleramide, hereinafter referred to as Compound A; N-(3,4-dichlorophenyl)-2-methylbutyramide, hereinafter referred to as Compound B; and N-(3,4-dichlorophenyl)-2,2-dimethylpropionamide, hereinafter referred to as Compound C.

These compounds are all tolerated to a high degree by peas at 0.75 pound per acre, and under the same greenhouse spraying conditions give a complete kill of red clover, wild mustard, cucumber, and buckwheat and greatly inhibit the growth of pigweed, ragweed and crabgrass. Moreover, Compound A is particularly selective with respect to alfalfa which tolerates it but not Compounds B or C and thus shows itself to be different from Compounds B and C in this respect. Moreover, Compound A in field testing on growing crops using a logarithmic sprayer in order to determine the rate at which the various plants are killed showed great selectivity to alfalfa, carrots and grain sorghum in requiring a much greater rate of application to kill these crops than undesired weeds that grow with them.

Typical test data showing selectivity in field tests are given in Table I. These data show the least amount of herbicide required to kill completely the various plants and are obtained by logarithmic change in concentration sprayed on plants growing in beds with movement forward of the sprayer. This selectivity is exemplified by the data in Table I for Compound A. The plants which require the highest rate of application for complete kill are more tolerant, and selectivity may be practiced by using just the amount required to accomplish the desired objective.

TABLE I

N-(3,4-dichlorophenyl)-2,2-dimethylvaleramide as a herbicide using logarithmic spreading (rate of application required for 100% kill of the plants)

| Plant: | Lb./acre |
|---|---|
| Alfalfa | >6 |
| Carrots | >6 |
| Mustard | <0.6 |
| Pigweed | <0.6 |
| Ragweed | 1.8 |
| Crabgrass | 3.0 |
| Clover | 1.7 |
| Flax | 1.7 |
| Panicum species | 2.8 |
| Tomato | 1.0 |
| Rye grass | 3.3 |
| Wheat | 2.9 |
| Oats | 4.7 |
| Lettuce | 0.6 |
| Cotton | 1.4 |
| Peanuts | 2.7 |
| Grain sorghum | >6 |
| Buckwheat | 0.7 |

The general procedure for carrying out the foliage spray tests in the greenhouse is one in which the test compounds are applied to 6 to 20 species of plants. In the general procedure the test compound is made into a concentrate using 40 ml. acetone for 3 grams compound, where, as here, the compound is not water soluble, and 2 ml. of a monosorbitan polyoxyethylene compound (Tween 20) as an organic surface-active agent. This concentrate is then converted into an emulsion by pouring with stirring into 200 ml. water, and the resulting emulsion is sprayed on the foliage of test plants which are in the second true leaf stage (2-3 weeks old). The test plants in pots are sprayed uniformly under a spray covering a known area with an amount of emulsion sufficient to give a coverage at a rate of 1 to 10 pounds per acre, the amount used depending on activity. In the present tests the coverage was at a rate of 0.75 pound per acre for the plants indicated. The amount of plant injury is observed over a two-week period and graded from no injury to complete kill. This range is further divided into a low range of nil to slight injury with complete recovery in two weeks, a medium range where there is severe burning or deforming of foliage but good recovery, and a high range of severe damage where the plants are either killed or so severely injured that the plant is stunted and does not grow further.

The general procedure for carrying out field tests with logarithmic spraying of Table I is described by Pfeiffer et al., Nature, 176, pages 472-3 (1955) and Day, Weeds, 6, pages 441-6 (1958).

The compounds of this invention are made into dispersible concentrates by mixing with a surface-active agent as a dispersing agent therefor, and the concentrate is readily diluted with a solid such as clay to form a dusting powder or with water to form an aqueous emulsion. The surface-active dispersing agents which may be used include fuller's earth, China clay, kaolin, attapulgite, bentonite, and related natural and synthetic aluminum silicates having the property of forming a colloidal gel. Other surface-active dispersing agents particularly useful for forming aqueous compositions are neutral soaps of resin acids, alginic acids, and fatty acids and ammonia, alkyl amines or alkali metals, saponins, gelatins, milk, soluble casein, vegetable proteins, sulfite lye, lignin pitch, sulfite liquor, long-chain (12-18 carbon) fatty alcohols and alkali metal salts of the sulfated fatty alcohols, salts of sulfinic acids, esters of long-chain fatty acids and polyhydric alcohols in which the alcohol groups are free, omega-substituted polyethylene glycols of relatively long-chain length, particularly those in which the omega substituent is aryl, alkyl or acyl.

The concentrate with clay is usually dispersed with additional clay in the field and used as a dust, while the concentrates containing the organic surface-active agents are usually diluted with water in the field and used as an aqueous emulsion.

The concentrates usually contain 1 to 10 percent surface-active agent, and these are usually diluted to dusts or aqueous emulsions containing 0.1 to 5 percent of the active compound of this invention.

The compositions are applied to the growing plants in their early stages of growth, usually shortly after the first true leaves appear and in a sufficient amount to act selectively on the undesired plants so as to allow the desired plants to survive. The rate of application of the compounds will be in the range of 1 to 10 pounds per acre depending on the results to be attained. In some cases, it may be desirable to make a second application before the weeds to be killed have reached the first true leaf stage.

The compounds of the present invention are made by the following general reactions:

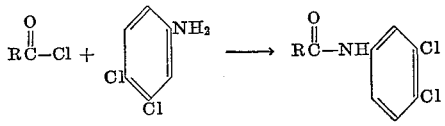

in which

is the acid chloride of 2,2-dimethylvaleric acid, 2-methyl-butyric acid or 2,2-dimethylpropionic acid following known general procedures.

What I claim and desire to protect by Letters Patent is:

1. A method for selective control of weeds in an alfalfa field which comprises applying to an alfalfa field containing a mixed growth of desired and undesired plants, including alfalfa, N-(3,4-dichlorophenyl)-2,2-dimethylvaleramide in an amount in the range of 1 to 10 pounds per acre sufficient to retard the growth of said undesired plants but insufficient to retard the growth of alfalfa.

2. A composition for selective control of weeds in an alfalfa field comprising a major amount of N-(3,4-dichlorophenyl)-2,2-dimethylvaleramide in a herbicidally effective amount as the herbicidally active compound, together with a surface active agent in an amount in the range of about 1 to 10% of said composition sufficient to effectively disperse said compound.

3. An aqueous emulsion for the selective control of weeds in an alfalfa field comprising water in which is dispersed a composition comprising a major amount of N-(3,4-dichlorophenyl)-2,2-dimethylvaleramide as the herbicidally active compound, together with an organic surface active agent in an amount in the range of about 1 to 10% of said composition and sufficient to effectively disperse said compound, the amount of said compound in said emulsion being in the range of 0.1 to 5% of said emulsion.

4. A process for controlling growth of weeds in crops which comprises applying thereto a herbicidally effective amount of a compound having the formula:

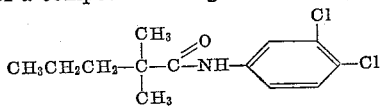

5. A process for controlling growth of weeds in crops which comprises applying thereto a herbicidally effective amount of a compound having a formula selected from the group consisting of

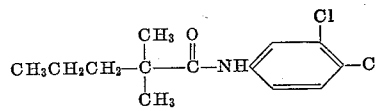

and

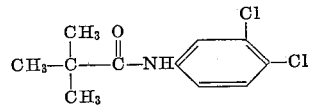

References Cited

UNITED STATES PATENTS

| | | | |
|---|---|---|---|
| 2,226,672 | 12/1940 | Smith. | |
| 2,648,621 | 8/1953 | Gerjovich et al. | 260—562 X |
| 2,944,081 | 7/1960 | Wright et al. | 260—562 |
| 2,977,212 | 3/1961 | Tischler et al. | 71—2.6 |
| 2,983,755 | 5/1961 | Kollonitsch et al. | 260—562 |
| 2,992,091 | 7/1961 | Harmon et al. | 71—2.6 |
| 3,020,142 | 2/1962 | Willard et al. | 71—2.3 |
| 3,108,038 | 10/1963 | Fielding et al. | |

FOREIGN PATENTS

| | | |
|---|---|---|
| 210,885 | 8/1960 | Austria. |
| 1,220,218 | 1/1960 | France. |
| 1,005,784 | 9/1957 | Germany. |

OTHER REFERENCES

Gertler et al., U.S. Dept. of Agriculture, Agriculture Research Service, ARS–33–14, pages 1–12, pages 1–5 relied on (1955).

Huffman et al., J. Agri. Food Chem., vol. 8, 1960, pages 298–302, July 1960.

LEWIS GOTTS, *Primary Examiner.*

J. O. THOMAS, J. S. LEVITT, W. A. BRINDISI, D. M. McCUTCHEN, *Examiners.*

E. J. MEROS, J. W. ADAMS, *Assistant Examiners.*